US008322671B2

(12) United States Patent
Myers et al.

(10) Patent No.: US 8,322,671 B2
(45) Date of Patent: Dec. 4, 2012

(54) TRAY MECHANISM WITH AUTOMATIC BEVERAGE HOLDING DEVICE

(75) Inventors: Ronald W. Myers, Dublin, OH (US); John Barlow, Jr., Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 283 days.

(21) Appl. No.: 12/607,088

(22) Filed: Oct. 28, 2009

(65) Prior Publication Data
US 2011/0095557 A1   Apr. 28, 2011

(51) Int. Cl.
*A47B 88/00* (2006.01)
(52) U.S. Cl. .................... 248/311.2; 224/926; 296/37.8; 312/330.1
(58) Field of Classification Search .............. 248/311.2, 248/312, 312.1, 309.1, 315; 224/926, 188.01, 224/483; 296/37.12, 37.8, 24.34; 297/188.15, 297/188.16, 188.17, 188.14; 312/330.1, 312/319.1, 319.5, 332, 334.8, 334.21
See application file for complete search history.

(56) References Cited

U.S. PATENT DOCUMENTS

| 3,606,112 | A | * | 9/1971 | Cheshier ..................... 224/554 |
| 4,286,742 | A | | 9/1981 | Pellegrino |
| 4,927,108 | A | | 5/1990 | Blazic et al. |
| 5,060,899 | A | * | 10/1991 | Lorence et al. ............ 248/311.2 |
| 5,141,194 | A | * | 8/1992 | Burgess et al. ............ 248/311.2 |
| 5,248,183 | A | * | 9/1993 | Gignac et al. ............ 297/188.16 |
| 5,379,978 | A | * | 1/1995 | Patel et al. ................ 248/311.2 |
| 5,427,447 | A | | 6/1995 | Satoh |
| 5,749,554 | A | * | 5/1998 | Avila et al. ................. 248/311.2 |
| 5,860,630 | A | * | 1/1999 | Wildey et al. ............... 248/311.2 |
| 5,944,240 | A | | 8/1999 | Honma |
| 6,450,468 | B1 | | 9/2002 | Hamamoto |
| 6,648,194 | B2 | * | 11/2003 | Schaal et al. .................. 224/483 |
| 6,702,241 | B2 | | 3/2004 | Harada |
| 6,749,079 | B2 | | 6/2004 | Katagiri et al. |
| 6,779,769 | B1 | * | 8/2004 | York et al. .................. 248/311.2 |
| 6,808,097 | B2 | * | 10/2004 | Kim et al. ..................... 224/483 |
| 6,854,779 | B2 | * | 2/2005 | Gehring et al. ............ 296/37.12 |
| 6,923,517 | B2 | * | 8/2005 | Yamamoto ..................... 312/332 |
| 6,942,267 | B1 | * | 9/2005 | Sturt ........................... 296/24.34 |
| 7,066,436 | B2 | * | 6/2006 | Honda et al. ................ 248/311.2 |
| 7,140,660 | B2 | * | 11/2006 | Oana ............................ 296/37.8 |
| 7,226,138 | B2 | | 6/2007 | Katagiri |
| 7,278,681 | B2 | * | 10/2007 | Lilov et al. ................ 297/188.17 |
| 7,487,946 | B2 | * | 2/2009 | Thomas ...................... 248/311.2 |
| 7,568,601 | B2 | * | 8/2009 | Kogami et al. ............... 224/483 |
| 7,624,960 | B2 | * | 12/2009 | Saenz ......................... 248/311.2 |

(Continued)

FOREIGN PATENT DOCUMENTS

JP    2006-063442 U    9/1994
(Continued)

OTHER PUBLICATIONS

PCT/US2010/052586, International Search Report, Jul. 1, 2011, date of mailing, via KIPO. PCT/US2010/052586, Written Opinion of the ISR, Jul. 1, 2011, date of mail, via KIPO.

*Primary Examiner* — Tan Le
(74) *Attorney, Agent, or Firm* — Clifford B. Vaterlaus; Emerson Thomson Bennett (57) ABSTRACT

A tray mechanism may include a tray having a storage zone and a beverage holding device having a receptacle. The beverage holding device may automatically extend as the tray is extended.

18 Claims, 7 Drawing Sheets

U.S. PATENT DOCUMENTS

| | | | |
|---|---|---|---|
| 7,784,843 B2* | 8/2010 | Lota et al. | 296/24.34 |
| 2005/0269919 A1* | 12/2005 | Sambommatsu et al. | 312/319.5 |
| 2006/0016279 A1 | 1/2006 | Sato et al. | |
| 2006/0060741 A1* | 3/2006 | Yanagita et al. | 248/311.2 |

FOREIGN PATENT DOCUMENTS

| | | |
|---|---|---|
| JP | 7-329626 | 12/1995 |
| JP | 2003-118465 A | 4/2003 |
| JP | 2003-300433 A | 10/2003 |

\* cited by examiner

TRAY MECHANISM WITH AUTOMATIC BEVERAGE HOLDING DEVICE

I. BACKGROUND

A. Field of Invention

This invention pertains to methods and apparatuses regarding vehicle tray mechanisms and, more specifically, to methods and apparatuses regarding a vehicle tray mechanism having a beverage holding device that automatically opens partially when the tray is opened.

B. Description of the Related Art

It is known to provide vehicles with a tray that can be opened to reveal a storage zone or area into which articles can be stored. The tray can then be closed, making the articles inaccessible. To access the articles, it is only necessary to reopen the tray. It is also known to provide vehicles with a beverage holding device (commonly referred to as a "cup holder") that can be opened or exposed so that a beverage can be held. The cup holder can also be closed, when it is undesirable to hold a beverage, to remove the cup holder from view.

Figure 7A:
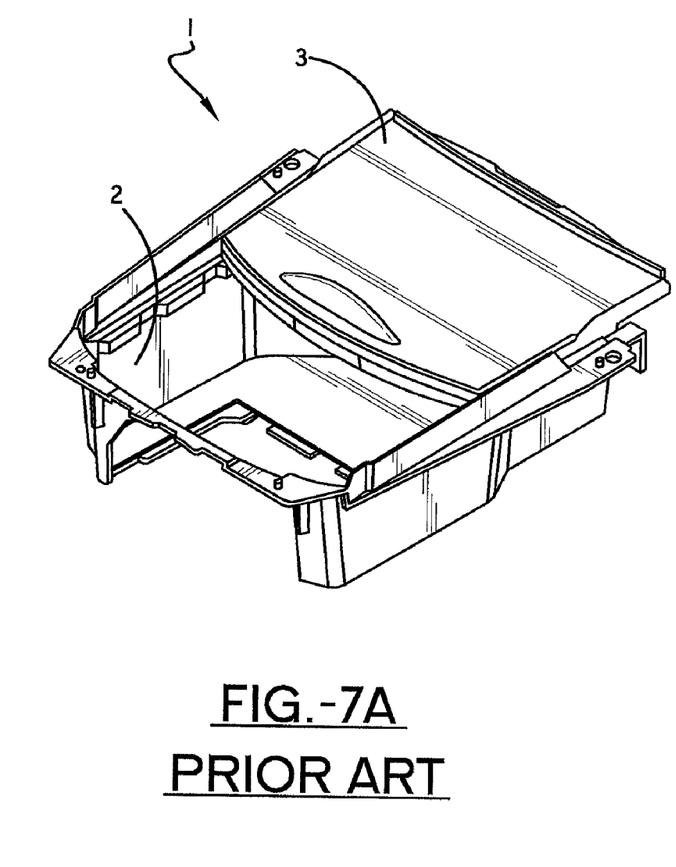
FIGS. 7a and 7b show a prior art tray mechanism.
Figure 7B:
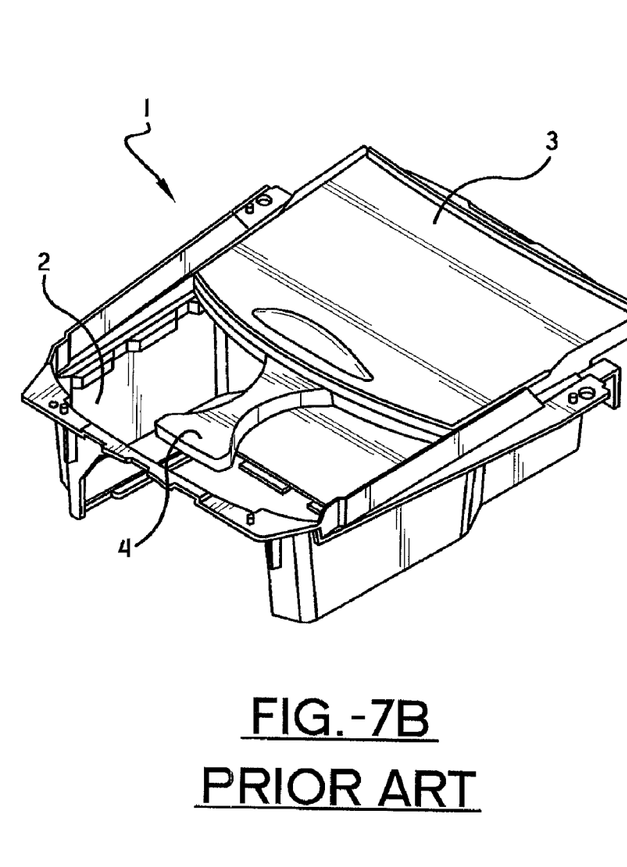

Known trays and cup holders generally work well for their intended purposes. A known difficulty, however, is related to the fact that it is desirable to provide multiple devices, including trays and cup holders, within easy reach of the vehicle driver. The area that the vehicle driver can reach is limited. Thus, typically vehicle manufactures provide either a tray or a cup holder within reach of the vehicle driver, but not both. The assignee of this patent has developed a solution to this problem by providing, as shown in FIGS. 7a and 7b, a tray mechanism 1. The tray mechanism 1 includes a storage zone or area 2 that can be used to store articles and that can be covered by moving a lid 3 over the storage zone 2. A cup holder device 4 can be extended over the storage zone 2, when the lid 3 is open as shown in FIG. 7b, so that beverages can be held in the storage zone 2 and rest against the cup holder device 4. The tray mechanism 1, though it works well for its intended purpose, has a limitation. The limitation is that the cup holder device 4 cannot be easily seen by the vehicle operator when in the stored condition, shown in FIG. 7a.

What is needed is a tray that can be opened and closed and a beverage holding device that is automatically opened partially when the tray is opened so that it is easily visible by the vehicle operator. In this way, the difficulties and limitations known in the prior art can be overcome.

II. SUMMARY

According to one embodiment of the invention, a tray mechanism may comprise: a repository having an opening; a tray, having a storage zone, that is moveable with respect to the repository within the opening; and, a beverage holding device, having a receptacle, that is moveable with respect to the repository and the tray. The tray mechanism may be adjustable into: (A) a first condition where: (1) the tray is positioned substantially within the opening and the storage zone is substantially inaccessible; and, (2) the beverage holding device is positioned substantially within the opening and the receptacle is substantially inaccessible; (B) a second condition where: (1) the tray extends at least partially outside the opening and the storage zone is accessible; and, (2) the beverage holding device automatically extends at least partially outside the opening as the tray is extended but the receptacle cannot be used to hold an associated beverage; and, (C) a third condition where: (1) the tray extends at least partially outside the opening; and, (2) the beverage holding device extends at least partially outside the opening and the receptacle can be used to hold the associated beverage.

According to another embodiment of the invention, a method may comprise the steps of: (A) providing a tray mechanism comprising: a repository having an opening; a tray, having a storage zone, that is moveable with respect to the repository within the opening; and, a beverage holding device, having a receptacle, that is moveable with respect to the repository and the tray; (B) adjusting the tray mechanism into a first condition where: (1) the tray is positioned substantially within the opening and the storage zone is substantially inaccessible; and, (2) the beverage holding device is positioned substantially within the opening and the receptacle is substantially inaccessible; (C) moving the tray with respect to the repository to adjust the tray mechanism into a second condition, where: (1) the tray extends at least partially outside the opening and the storage zone is accessible; and, (2) the beverage holding device extends at least partially outside the opening but the receptacle cannot be used to hold an associated beverage; and, (D) moving the beverage holding device with respect to the tray, while the tray extends at least partially outside the opening, to adjust the tray mechanism into a third condition, where: the beverage holding device extends further outside the opening than in step (C) and the receptacle can be used to hold the associated beverage. Step (C) may comprise the step of: automatically extending the beverage holding device at least partially outside the opening by moving the tray with respect to the repository.

According to yet another embodiment of the invention, a console for a vehicle may comprise: a tray mechanism comprising: a repository mounted to the console and having an opening; a tray, having a storage zone, that is moveable with respect to the repository within the opening; a beverage holding device, having a receptacle, that is moveable with respect to the repository and the tray; and, a biasing device operatively connected to the beverage holding device. The tray mechanism may be adjustable into: (A) a first condition where: (1) the tray is positioned substantially within the opening and the storage zone is substantially inaccessible; and, (2) the beverage holding device is positioned substantially within the opening and the receptacle is substantially inaccessible; (B) a second condition where: (1) the tray extends at least partially outside the opening and the storage zone is accessible; and, (2) the beverage holding device is automatically extended by the biasing devise at least partially outside the opening as the tray is extended but the receptacle cannot be used to hold an associated beverage; and, (C) a third condition where: (1) the tray extends at least partially outside the opening; and, (2) the beverage holding device extends at least partially outside the opening and the receptacle can be used to hold the associated beverage.

III. BRIEF DESCRIPTION OF THE DRAWINGS

The exemplary embodiments may take physical form in certain parts and arrangement of parts, embodiments of which will be described in detail in this specification and illustrated in the accompanying drawings which form a part hereof and wherein.

IV. DETAILED DESCRIPTION

Figure 1:
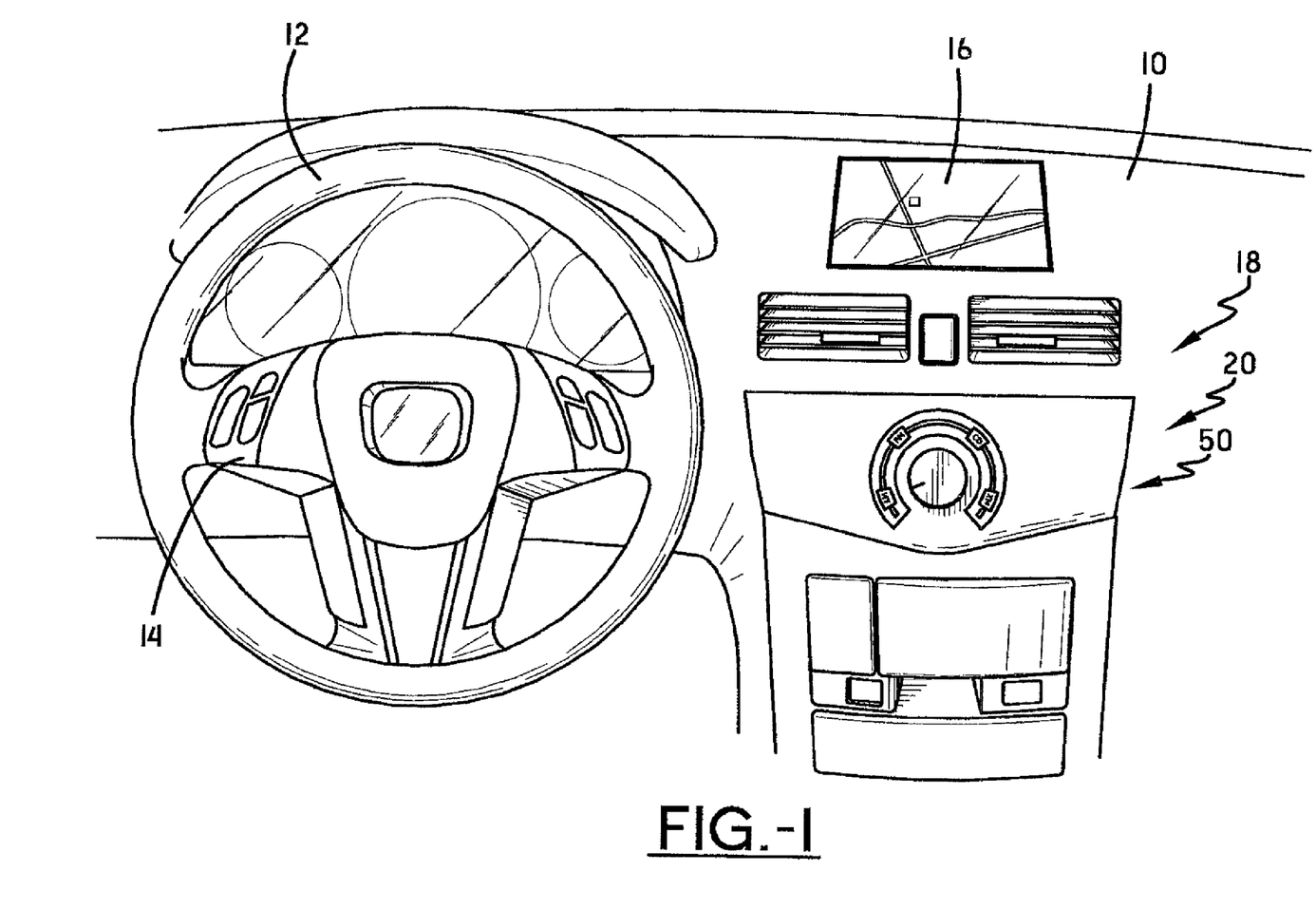
FIG. 1 is a perspective view of a vehicle interior.

Referring now to the drawings wherein the showings are for purposes of illustrating exemplary embodiments only and not for purposes of limiting the same, and wherein like reference numerals are understood to refer to like components, FIG. 1 shows the interior of a vehicle that may include a tray mechanism 50 according to one embodiment of this invention. It should be noted that while an automotive passenger vehicle is depicted, this invention will work well with other vehicles including all types of trucks, motorcycles, all-terrain vehicles (ATVs), sport utility vehicles (SUVs), vans, boats, airplanes, etc., and for other purposes as well. The vehicle may include various vehicle components such as a steering wheel 12 equipped with vehicle controls 14. The vehicle may also include an instrument panel or dash board 10. Mounted to the dash board 10 may be a navigation system 16, the controls of a Heating, Ventilating and Air Conditioning (HVAC) system 18 and a console 20. Here by "console" it is meant any support structure mounted to a vehicle which may be used to hold or store automotive components and/or miscellaneous articles. While the console 20 shown is mounted to the dash board 10 it is to be understood that when, according to one embodiment of this invention, the tray mechanism 50 is mounted to a console, the console can be positioned anywhere on the vehicle chosen with the sound judgment of a person of skill in the art. Other non-limiting examples of locations for a console are between the front seats, mounted to the vehicle door, and mounted to the vehicle roof.

Figure 2:
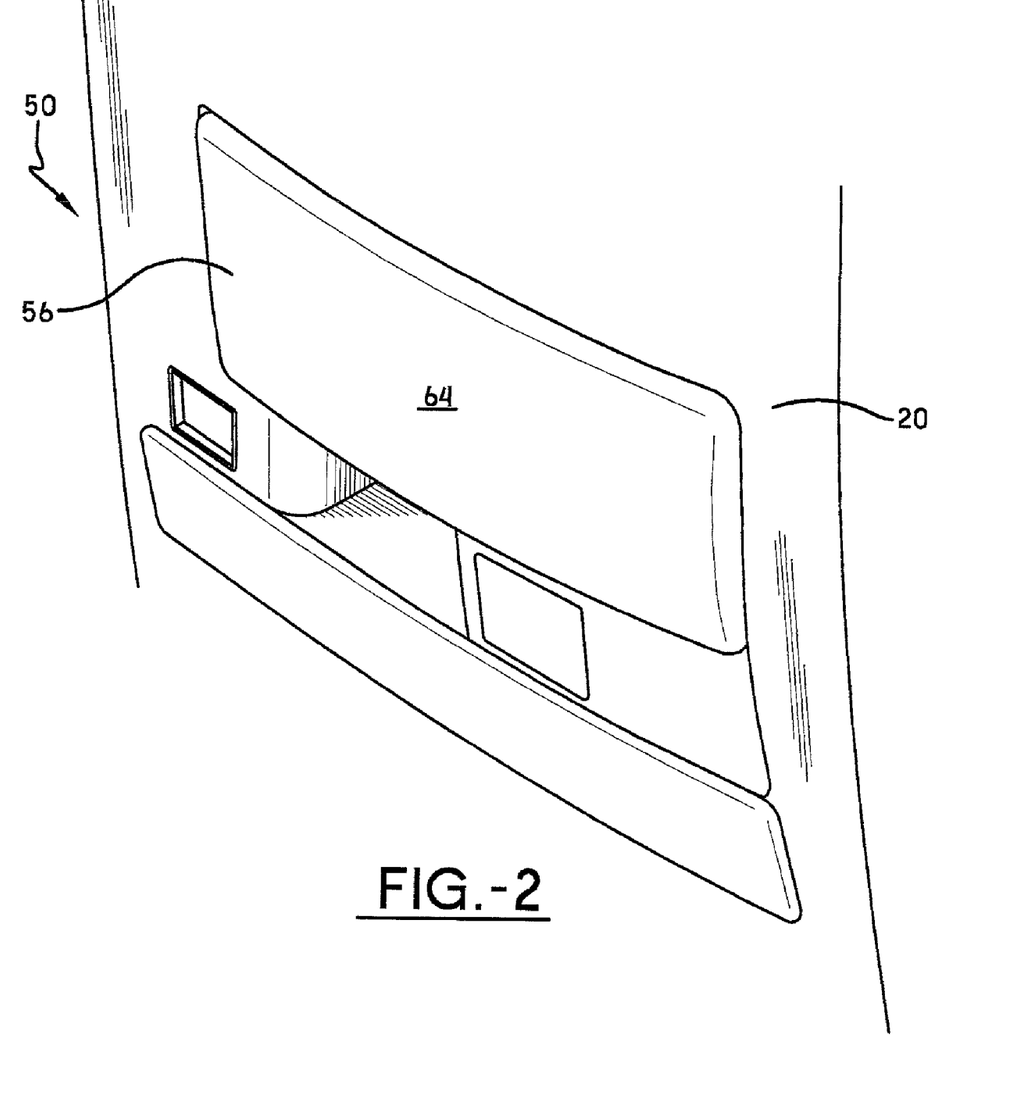
FIG. 2 is a perspective view of a tray mechanism according to one embodiment of this invention with the tray shown in a closed condition.
Figure 5:
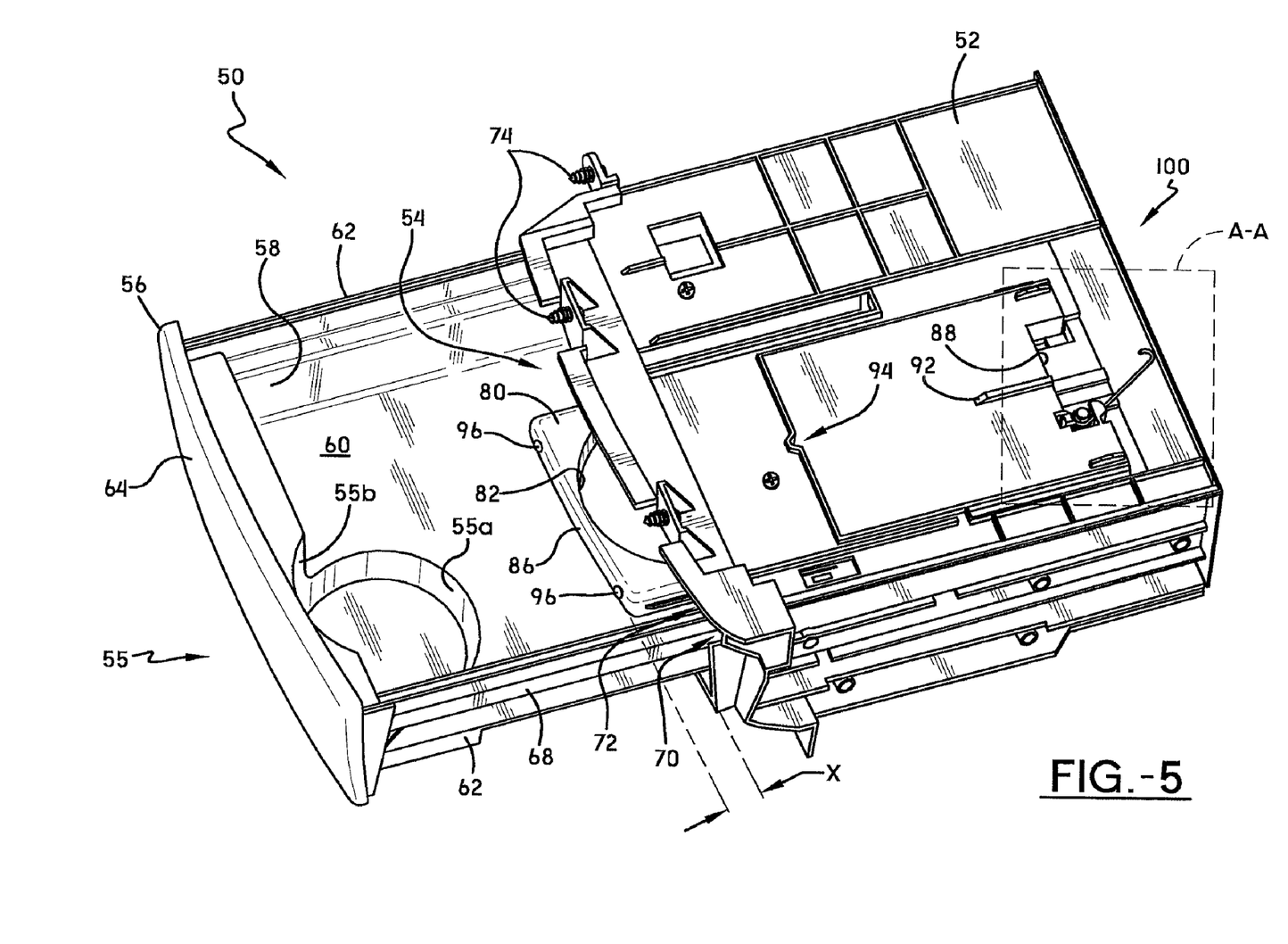
FIG. 5 is a perspective view of the tray mechanism of FIG. 2 but showing the tray mechanism detached from a vehicle.
Figure 6:
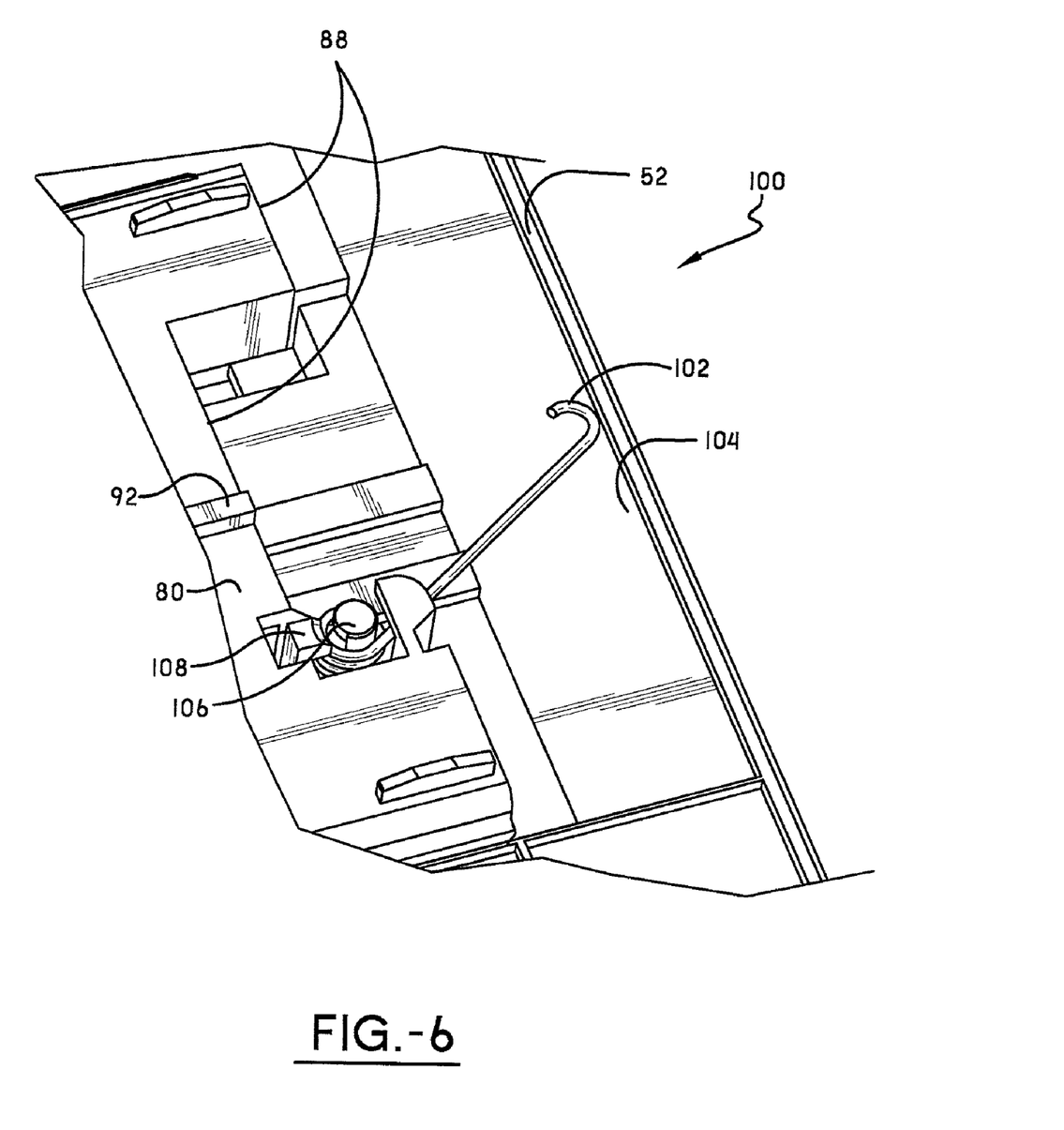
FIG. 6 is an exploded view of section A-A from FIG. 5.

With reference now to FIGS. 1, 2 and 5, the tray mechanism 50 may include a repository 52 that is mounted to the vehicle and that has an opening 54. The manner in which the repository 52 is mounted to the vehicle can be any chosen with the sound judgment of a person of skill in the art. For the embodiment shown, the repository 52 is fixedly mounted to the console 20 using attachment screws 74 or the like. In another embodiment, the repository is not a separate part but rather is "built-in" to the console 20 or other portion of the vehicle. Thus "repository" is to be understood to mean any vehicle component, chosen with the sound judgment of a person of skill in the art that can receive a tray as described below.

With reference now to FIGS. 1-5, the tray mechanism 50 may also include a tray 56 having a storage zone 58 for use in storing articles or items as desired. The tray 56 may have any design chosen with the sound judgment of a person of skill in the art. For the embodiment shown, the tray 56 has a bottom 60, a pair of side walls 62, 62, a front wall 64 and a back wall 66 that together define the storage zone 58. The tray 56 may also have at least one beverage holding feature 55, two shown, that assist in securing a beverage to the tray mechanism 50. For the embodiment shown, one beverage holding feature 55a is a cutout formed on the bottom 60 that receives a bottom portion of a beverage in a known way and another beverage holding feature 55b is a cutout formed on the front wall 64 that receives a side portion of a beverage in a known way. The tray 56 may be received within the opening 54 formed in the repository 52 and may be movable relative to the repository 52. While the manner in which the tray 56 moves relative to the repository 52 within the opening 54 can be any chosen with the sound judgment of a person of skill in the art, for the embodiment shown the tray 56 is slidable with respect to the repository 52 along rails 68 formed on the side walls 62, 62 which are received in corresponding grooves 70 formed in the side walls of the repository 52. In another embodiment, the rails may be formed on the repository 52 and received within grooves formed in the tray 56. The tray 56 can be moved (slid as shown in the FIGURES) between a fully closed condition, shown in FIGS. 1 and 2, where the storage zone 58 is inaccessible by the vehicle operator and, a fully open condition, shown in FIGS. 3, 4 and 5, where the storage zone 58 is accessible.

With reference now to FIGS. 1-6, the tray mechanism 50 may also include a beverage holding device 80 having at least one receptacle 82 for use in receiving a beverage as desired. Here by "beverage" it is meant the container, such as a can, bottle, cup, or the like, that may be used to hold a drinkable fluid, such as soda, water, coffee, etc. It is to be understood, however, that any item, including non-beverages, chosen with the sound judgment of a person of skill in the art could also be received within the receptacle 82. While the receptacle 82 shown is a circular opening formed in the beverage holding device 80, it is to be understood that the design for the receptacle 82 can be any chosen with the sound judgment of a person of skill in the art. In another embodiment, shown in FIG. 7b, the receptacle may be simply a surface that contacts and/or guides the beverage. The beverage holding device 80 may have any design chosen with the sound judgment of a person of skill in the art. For the embodiment shown, the beverage holding device 80 is a substantially planar plate member having a first or front end 86, a pair of side walls 84, 84, and a second or back end 88. The beverage holding device 80 may have at least one boss or protrusion 96 that is received within a corresponding hole (not visible) formed on the inner surface of front wall 64 as discussed further below. In another embodiment, the beverage holding device 80 may have a tab 110 that is movably attached (such a by being "spring loaded," as known to those of skill in the art) to the beverage holding device 80 so that it extends into the receptacle 82 to assist in holding the beverage. The operation of such a tab 110 is known to those of skill in the art so further details will not be provided here.

With continuing reference to FIGS. 1-6, the beverage holding device 80 may be received within the opening 54 formed in the repository 52 and may be movable relative to the repository 52. While the manner in which the beverage holding device 80 moves relative to the repository 52 within the opening 54 can be any chosen with the sound judgment of a person of skill in the art, for the embodiment shown the beverage holding device 80 is slidable with respect to the repository 52 along at least one rail 90 formed in at least one of the side walls 84 which is received in a corresponding groove 72 formed in the repository 52. In addition to or instead of the rail 90, the beverage holding device 80 may have one or more ribs 92 that may be received within one or more corresponding channels 94. In another embodiment, the rail and/or rib may be formed on the repository 52 and received within a groove and/or channel formed in the beverage holding device 80.

With continuing reference to FIGS. 1-6, a biasing device 100 may be used to cause the beverage holding device 80 to automatically extend at least partially outside the opening 54 in the tray 56 as the tray 56 is extended. By "automatically" it is meant that the beverage holding device 80 extends without direct human contact of the beverage holding device 80. For the embodiment shown, the biasing device 100 creates the force to extend the beverage holding device 80. While the biasing device 100 used with this invention can be of any type chosen with the sound judgment of a person of skill in the art, for the embodiment shown the biasing device 100 is a spring. More specifically, the shown biasing device 100 is a torsion spring having a first end in contact with the beverage holding device 80 and a second end 102 that may contact a relatively fixed surface, such as surface 104 of the repository 52. The beverage holding device 80 may have a pin 106 that receives a coiled section of the torsion spring 100, as seen best in FIG. 6. A flap member 108 may be used to maintain the torsion spring 100 on the pin 106 in a known manner.

Figure 3:
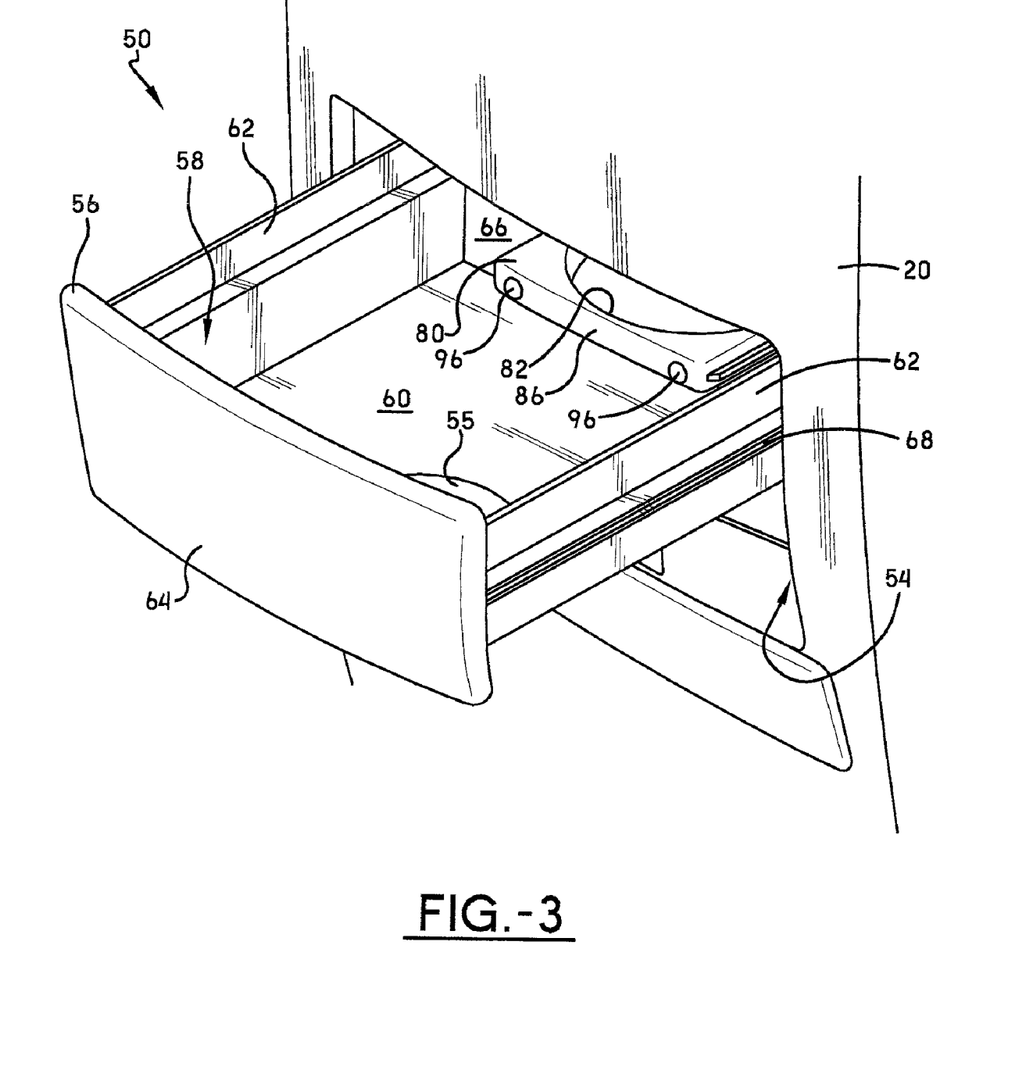
FIG. 3 is a perspective view of the tray mechanism of FIG. 2 but with the tray shown in an open condition and the beverage holding device shown partially open.

Still referring to FIGS. 1-6, the operation of the tray mechanism 50 will now be described. The tray mechanism 50 may begin in a closed condition, shown in FIGS. 1-2, where the tray 56 is positioned within the opening 54 and the storage zone 58 is inaccessible. In this closed condition the beverage holding device 80 is positioned within the opening 54 and the receptacle 82 is inaccessible. If desirable, the operator may open the tray mechanism 50 by gripping the tray 56 (at the bottom of the front wall 64, for example) and sliding the tray 56 so that it extends outside the opening 54. This condition is shown in FIGS. 3 and 5. Note that in this condition the storage zone 58 is accessible so that articles may be placed within or removed from the storage zone 58. Note also that in this condition the beverage holding device 80 automatically extends partially outside the opening 54 due to the force provided by the biasing device 100. The amount of automatic extension provided, indicated by reference X in FIG. 5, can be any chosen with the sound judgment of a person of skill in the art. In one embodiment, the front end 86 of the beverage holding device 80 extends a distance X between 10 millimeters and 40 millimeters. In a more specific embodiment, the distance X is about 25 millimeters. The distance X may be greater than zero so that the beverage holding device 80 can be easily seen by the operator. The distance X may be limited to permit easy access to the storage zone 58 without interference with the beverage holding device 80. In one embodiment, as shown in FIG. 5, the distance X is sufficient to make the receptacle 82 visible to the operator yet insufficient to use the receptacle 82 to hold a beverage.

Figure 4:
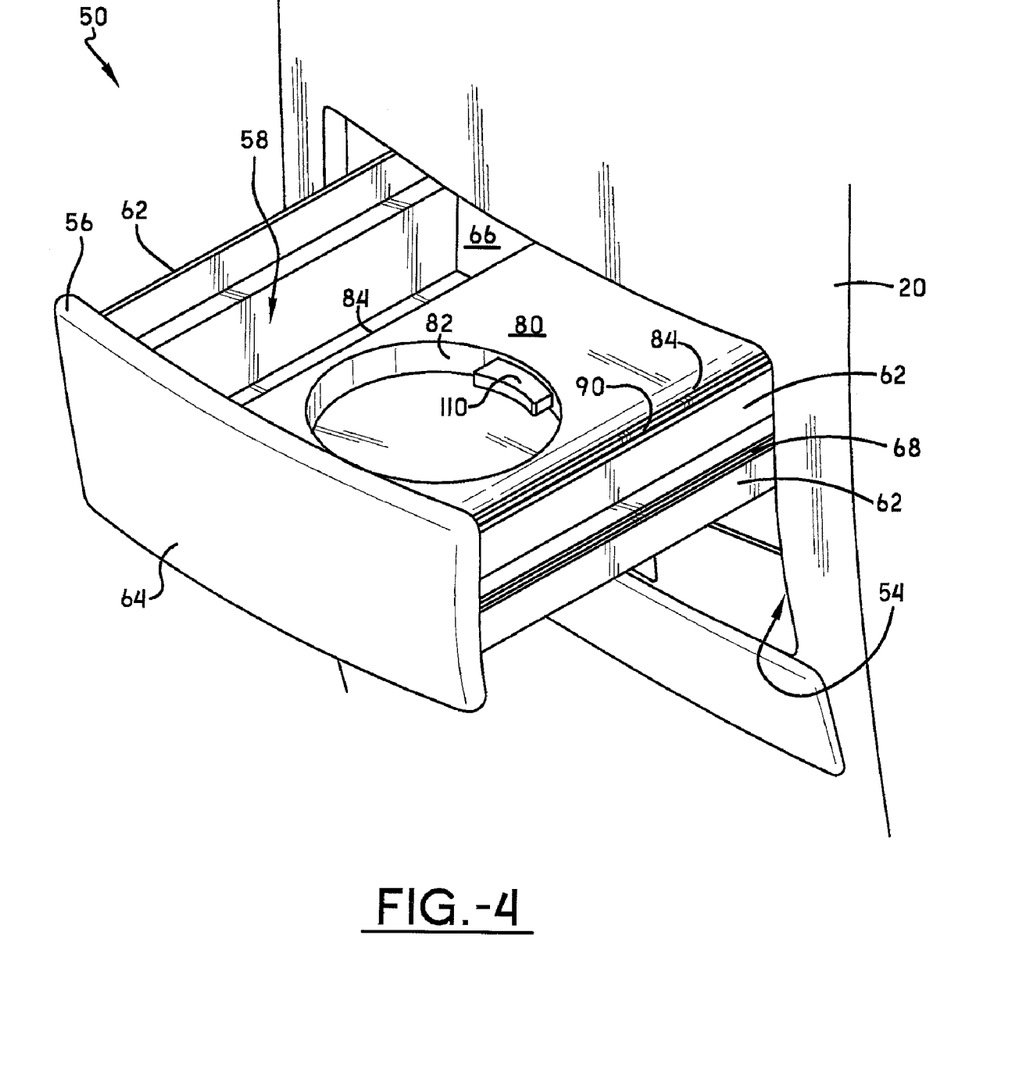
FIG. 4 is a perspective view of the tray mechanism of FIG. 2 but with both the tray and the beverage holding device shown in open conditions.

With continuing reference to FIGS. 1-6, after the tray 56 has been opened, if desirable the operator may pull the beverage holding device 80, sliding it so that it extends outside the opening 54 sufficient for the receptacle 82 to be used to hold a beverage. This condition is shown in FIG. 4. In one embodiment, beverage holding device 80 is extended until the boss or protrusion 96 is received within a corresponding hole formed on the inner surface of front wall 64 to create a more stable connection between the beverage holding device 80 and the tray 56. In one embodiment, beverage holding device 80 is extended until the beverage holding feature(s) 55 is aligned with the receptacle 82. In this condition, a beverage can be inserted into the receptacle 82 and then received with the beverage holding feature 55 to create a more stable holding situation for the beverage. If desirable, such as if it is not necessary to hold a beverage any longer but it is desirable to provide access to the storage zone 58, the beverage holding device 80 can be slid from the condition shown in FIG. 4 to the condition shown in FIG. 3.

Still referring to FIGS. 1-6, when it becomes desirable to close the tray 56, the operator may push it (on the outer surface of the front wall 64, for example) to slide the tray 56 so that it recedes back into the opening 54. This is the closed condition shown in FIGS. 1 and 2. It should be noted that as the tray 56 is being closed, the inner surface of the front wall 64 contacts the front end 86 of the beverage holding device 80 to cause it to slide (and overcome the biasing force of the biasing device 100) so that it also recedes back into the opening 54. Similarly, if the tray mechanism 50 is in the condition shown in FIGS. 3 and 5, when it is desired to close the tray 56, the operator may push it to slide the tray 56 until the inner surface of the front wall 64 contacts the front end 86 of the beverage holding device 80. Continued pushing on the tray 56 causes both the tray 56 and the beverage holding device 80 to recede back into the opening 54.

Numerous embodiments have been described, hereinabove. It will be apparent to those skilled in the art that the above methods and apparatuses may incorporate changes and modifications without departing from the general scope of this invention. It is intended to include all such modification and alterations in so far as they come within the scope of the appended claims or the equivalents thereof.

What is claimed is:

1. A tray mechanism comprising:
a repository having an opening;
a tray, having a storage zone, that is moveable with respect to the repository within the opening between a fully open condition and a fully closed condition;
a beverage holding device, having a receptacle, that is moveable with respect to the repository and the tray;
a biasing device that biases the beverage holding device; and,
wherein the tray mechanism is adjustable into:
(A) a first condition where: (1) the tray is positioned in the fully closed condition substantially within the opening and the storage zone is substantially inaccessible; and, (2) the beverage holding device is positioned substantially within the opening and the receptacle is substantially inaccessible;
(B) a second condition where: (1) the tray is positioned in the fully open condition extending outside the opening and the storage zone is accessible; and, (2) the biasing device biases the beverage holding device to automatically extend at least partially outside the opening as the tray is extended but the receptacle cannot be used to hold an associated beverage; and,
(C) a third condition where: (1) the tray remains in the fully open condition extending outside the opening; and, (2) the beverage holding device extends farther outside the opening than in step (B) and the receptacle can be used to hold the associated beverage.

2. The tray mechanism of claim 1 wherein the biasing device biases the beverage holding device to automatically extend between 10 and 40 millimeters outside the opening as the tray is extended.

3. The tray mechanism of claim 1 wherein when the biasing device biases the beverage holding device to automatically extend in the second condition, the receptacle is visible to an associated operator.

4. The tray mechanism of claim 1 wherein:
the beverage holding device has a first end that automatically extends at least partially outside the opening as the tray is extended and a second end; and,
the biasing device is a torsion spring having a first end that is operatively connected to the second end of the beverage holding device and a second end that is operable to contact a surface of the repository.

5. The tray mechanism of claim 1 wherein when the tray mechanism is adjusted into the first condition the storage zone is inaccessible and the receptacle is inaccessible.

6. The tray mechanism of claim 1 wherein the tray is slidable with respect to the repository and the beverage holding device is slidable with respect to the repository.

7. The tray mechanism of claim 1 wherein:
the tray comprises a beverage holding feature within the storage zone; and,
when the tray mechanism is adjusted into the third condition, the beverage holding feature and the beverage holding device receptacle are aligned to be able to collaboratively hold the associated beverage.

8. The tray mechanism of claim 1 further comprising:
a tab that is movably attached to the beverage holding device and that is extendable into the receptacle to assist in holding the associated beverage.

9. A method comprising the steps of:
(A) providing a tray mechanism comprising: a repository having an opening; a tray, having a storage zone, that is moveable with respect to the repository within the opening between a fully open condition and a fully closed condition; and, a beverage holding device, having a receptacle, that is moveable with respect to the repository and the tray;
(B) adjusting the tray mechanism into a first condition where: (1) the tray is positioned in the fully closed condition substantially within the opening and the storage zone is inaccessible; and, (2) the beverage holding device is positioned substantially within the opening and the receptacle is inaccessible;
(C) moving the tray with respect to the repository to adjust the tray mechanism into a second condition, where: (1) the tray is positioned in the fully open condition extending outside the opening and the storage zone is accessible; and, (2) the beverage holding device extends at least partially outside the opening but the receptacle cannot be used to hold an associated beverage;
(D) moving the beverage holding device with respect to the tray, while the tray remains in the fully open condition extending outside the opening, to adjust the tray mechanism into a third condition, where: the beverage holding device extends further outside the opening than in step (C) and the receptacle can be used to hold the associated beverage; and,
wherein step (C) comprises the step of: using a biasing mechanism to automatically extend the beverage holding device outside the opening by moving the tray with respect to the repository.

10. The method of claim 9 wherein step (C) comprises the step of:
automatically extending the beverage holding device between 10 and 40 millimeters outside the opening.

11. The method of claim 9 wherein step (B) comprises the step of:
adjusting the beverage holding device substantially within the storage zone.

12. The method of claim 9 wherein:
step (A) comprises the step of: providing the tray with a beverage holding feature; and,
step (D) comprises the step of: aligning the beverage holding device receptacle with the beverage holding feature.

13. The method of claim 9 wherein:
step (C) comprises the step of: manually sliding the tray with respect to the repository to thereby automatically slide the beverage holding device with respect to the repository; and,
step (D) comprises the step of: manually sliding the beverage holding device with respect to the repository.

14. A tray mechanism comprising:
a repository having an opening;
a beverage holding device, having a receptacle, that is moveable with respect to the repository between: (a) a fully closed condition where the receptacle is substantially inaccessible; and, (b) a fully open condition where the receptacle is substantially accessible;
a tray, having a storage zone, that is moveable with respect to the repository within the opening between: (a) a fully closed condition where the storage zone is substantially inaccessible; and, (b) a fully open condition where the storage zone is substantially accessible, the tray having a surface that contacts the beverage holding device to force the beverage holding device to move toward its fully closed condition as the tray is moved toward its fully closed condition; and,
a biasing device that biases the beverage holding device to automatically move into a partially open condition, between the fully closed condition and the fully open condition, where the beverage holding device extends partially outside the opening when the tray is in the fully open condition.

15. The tray mechanism of claim 14 wherein the beverage holding device automatically extends between 10 millimeters and 40 millimeters outside the opening when in the partially open condition.

16. The tray mechanism of claim 15 wherein the tray is slidable with respect to the repository and the beverage holding device is slidable with respect to the repository.

17. The tray mechanism of claim 16 wherein:
the repository is mounted to a vehicle console; and,
the biasing device is a torsion spring having a first end in contact with the beverage holding device and a second end in contact with the repository.

18. The tray mechanism of claim 17 wherein:
the tray comprises a beverage holding feature within the storage zone;
when the tray and the beverage holding device are both in the fully open condition, the beverage holding feature and the receptacle are aligned to be able to collaboratively hold an associated beverage; and,
the tray mechanism further comprises: a tab that is movably attached to the beverage holding device and that is extendable into the receptacle to assist in holding the associated beverage.

* * * * *